United States Patent
Gluck

(10) Patent No.: US 6,935,473 B1
(45) Date of Patent: Aug. 30, 2005

(54) COMPOSITE PROFILED SECTION

(76) Inventor: Joachim Gluck, Heuwies 35, D-78713 Schramberg, Sulgen (DE)

( * ) Notice: Subject to any disclaimer, the term of this patent is extended or adjusted under 35 U.S.C. 154(b) by 0 days.

(21) Appl. No.: 09/786,568

(22) PCT Filed: Aug. 7, 1999

(86) PCT No.: PCT/DE99/02887

§ 371 (c)(1),
(2), (4) Date: May 14, 2001

(87) PCT Pub. No.: WO00/13930

PCT Pub. Date: Mar. 16, 2000

(30) Foreign Application Priority Data

Sep. 7, 1998 (DE) ............................. 198 40 720

(51) Int. Cl.[7] ............................................... B60M 1/00
(52) U.S. Cl. ........................... 191/29 DM; 191/22 DM
(58) Field of Search ........................... 191/22, 29 DM, 191/22 DM

(56) References Cited

U.S. PATENT DOCUMENTS

| | | | | |
|---|---|---|---|---|
| 3,733,696 A | * | 5/1973 | Scofield et al. | 191/22 DM |
| 5,249,654 A | * | 10/1993 | Bruning | 191/22 DM |
| 5,967,271 A | * | 10/1999 | Wompner et al. | 191/22 DM |

FOREIGN PATENT DOCUMENTS

JP 1-254434 * 10/1989

* cited by examiner

*Primary Examiner*—Mark T. Le
(74) *Attorney, Agent, or Firm*—Bachman & LaPointe, P.C.

(57) ABSTRACT

A composite profiled section consisting of a base profiled section (1) made of a good electro-conductive material and at least one surface layer that is joined to the base profiled section (1) and is made of a material, such as a metal anti-wear strip (19), with a high resistance to abrasion. At least one of the longitudinal edges of the anti-wear strip (19) should contain recesses (27), notches (77, 78) or compressions (82) that are at least partially filled with a connecting substance (59) or a connecting profile (11, 39, 66, 69, 74) for connection to the base profiled section (1) in a positive or non-positive fit.

10 Claims, 10 Drawing Sheets

COMPOSITE PROFILED SECTION

The invention relates to a composite profiled section having a basic profiled section made from a material with a good electrical conductivity and at least one surface coating which is joined to the basic profiled section and is made from a material with a high resistance to abrasion, in particular a metal wearable strip, and to a process for producing a composite profiled section.

Composite profiled sections according to the invention are generally used as conductor rails for the electrification of rail-borne vehicles. The current is taken off by current collectors brushing along a surface of the conductor rail. Since the soft material aluminum has a very poor resistance to abrasion, a stainless-steel strip with a high abrasive strength forms the contact surface which is joined to the basic profiled section with a good electrical conductivity.

Conductor rails of this type were used primarily for small transport systems. On account of the relatively low loads, most conductor rails had steel strips with small thicknesses of at most 3 mm. Accordingly, most processes for producing composite profiled sections describe joining techniques which are only suitable for steel strips with a thickness of up to approximately 3 mm. To produce conductor rails with wearable strips with a thickness of 4.5–6 mm or greater from stainless steel, currently only two processes, which are described below, have proven economical. Since, as transport systems travel at increasing speeds, not only the wear rises considerably, which has led to the use of thicker wearable strips, but also the mechanical stresses rise, the conventional joining techniques using screws and bolts for connecting the steel strip to the aluminum profiled section no longer suffice or further reduce the economic viability thereof.

DE-C 24 32 541 has disclosed a process for producing conductor rails from a support profiled section and at least one bearing region which forms at least a part of the surface of the support profiled section from profiled strip of another metal.

During an extrusion process, the support profiled section is produced by pressing out an aluminum bolt through the shaping cross section of an extrusion die. At the same time, a profiled strip runs through the extrusion die parallel to the longitudinal axis of the support profiled section and forms a surface of the subsequent composite profiled section. During the extrusion, an intimate metallic welded join is formed between the support profiled section and the profiled strip.

This composite adhesion can only be quantitatively checked by means of shear tests which destroy the profiled section. If, in operation, extremely high loads occur on the composite, these loads may lead to the join fracturing, without this being externally visible. Therefore, the composite profiled section routinely has to be checked for detached joins, at high cost, by means of ultrasound or similar methods. Composite profiled sections with a mechanical or positively locking join between the two profiled sections do not have this drawback.

Patent GB 2 231 544 shows one possible option for mechanically joining a basic profiled section made from aluminum and a steel strip, by the steel strip enclosing a shoulder of the basic profiled section on both sides. The production process is based on assembling the steel strip from two J-shaped shell halves at the end side on the long limb and welding together the center of the strip over the entire length of the profiled section. The steel strip holds on account of the positively locking clamping around the profiled-section shoulder of the basic profiled section by means of the inwardly bent-back short limbs of the welded steel strip.

However, as the abrasion of the steel strip increases, the clamping loses stability and the steel strip can be pulled off the basic profiled section with little force.

According to U.S. Pat. No. 3,733,696, a substantially C-shaped stainless steel strip is held as a result of nails or bolts being driven or shot into the short limbs of the wearable strip, laterally into a basic profiled section, at regular intervals. In another variant, the short limb is laterally calked, by ramming, into a basic profiled section, so that small pits are formed in the basic profiled section, in which the molded recesses in the wearable strip rest. Processes of this type are no longer suitable for stainless steel strips with a thickness of, for example, 6 mm. Other precautions involve drilled holes passing through the short limbs and/or into the basic profiled section. Accordingly, the wearable strip is joined to the basic profiled section by means, for example, of connecting elements.

The connecting elements, such as bolts, screws, etc., are generally made from a third material. They have to be coated by electrodeposition or protected against corrosion in some other suitable way. A further drawback is that to secure wearable strips with a thickness of more than 3 mm, with the higher mechanical holding forces which are therefore required when using the conductor rails, the distance between the connecting elements has to be considerably reduced and therefore the number of connections has to be considerably increased. This makes the processes uneconomical.

According to the inventions described in U.S. Pat. No. 5,161,667, it is known for a wearable strip to be bent downward over the longitudinal edges of the basic profiled section and to be inserted or rolled into existing longitudinal grooves in the basic profiled section. A laterally projecting profiled-section molded protuberance, which forms a longitudinal groove with the basic profiled section, is pushed laterally onto a short limb of the wearable profiled section. A profiled-section thickened part in the form of a folded-over strip longitudinal edge of the wearable strip is enclosed by the profiled-section molded protuberance and is securely clamped to the basic profiled section during assembly.

This type of assembly is only suitable for relatively thin wearable strips of at most 2–3 mm. Steel strips with thicknesses of, for example, 5 mm can no longer be produced using this process, since they can no longer be folded over. Although the process described can also be carried out for thick steel strips as a result of a thickened part at the end of the short limb, e.g. produced by roller shaping of the steel strip, because of the low flexural strength of the thin profiled-section limb it is easy for it to be opened out again, and consequently the required adhesive strength and protection against the steel strip being torn or pulled off cannot be achieved. To prevent this, it is necessary to ensure that the profiled-section limb, following the joining technique, can no longer be detached or can only be detached by means of a special tool or by breaking or destruction.

A further drawback of some of the above processes is that the joining technique leads to deformation of the basic profiled section, so that following abrasion of the wearable strip the basic profiled section becomes unusable, since it is no longer possible for a new wearable strip to be joined to the basic profiled section.

In view of this prior art, the inventor has set himself the target of improving the join between basic profiled section and wearable strip compared to the above processes and, in particular, of providing a process with the aid of which wearable strips with a thickness of at least 6 mm can be secured with a reliable connection to the basic profiled section. In addition, the invention is to allow the wearable strip, after the end of its service life, and/or sections within a conductor rail with a high level of abrasion to be renewed by inserting a new strip section.

This object is achieved by the fact that the wearable strip, on at least one of its longitudinal edges, has recesses, indentations or stamped-in portions, which are at least partially filled by means of a joining material or joining profiled section and are thus joined to the basic profiled section in a nonpositively and/or positively locking manner.

According to the invention, the wearable strip has recesses on both longitudinal edges. Separate joining profiled sections (calking bars) are fitted into the recesses from the outside and are calked to the basic profiled section, or material of a profiled-section limb which is joined to the basic profiled section is pressed in and at least partially fills the recesses, so that the wearable strip is joined to the basic profiled section in a nonpositively and positively locking manner. As a result of plastic deformation of the joining profiled sections or the profiled-section limbs at least in the recesses in the wearable strip and/or the longitudinal groove of the basic profiled section, it is ensured that it is no longer possible for the joining profiled sections to be torn out or for the profiled-section limbs to be turned or bent out.

By way of example, after the wearable strip has been fitted on, profiled-section limbs which project from both sides of the basic profiled section are pushed laterally onto the longitudinal edges of the profiled strip. By means of ram-like calking tools or molded protuberances on the rim of a calking roller, material of the profiled-section limbs is additionally pushed and calked into the recesses in the wearable strip, so that on the outside it is possible to see an indentation or calking impression in the profiled-section limb. As a result, the recesses in the steel strip are at least partially filled.

The calked-in material of the profiled-section limbs presses against the flanks of the recesses in the steel strip. A high level of static friction is achieved as a result of the large area thereof and the calking pressure against the surface. Furthermore, the filling of the recesses produces a positive lock which prevents the profiled-section limb from being able to be pulled or turned out.

It is particularly advantageous that, on account of the prefabricated recesses in the wearable strip, generally a steel strip, the latter does not have to be indented and steel does not have to be displaced. The plastic deformation takes place predominantly in the limbs of the basic profiled section, which is made from generally soft aluminum, with the result that relatively low calking forces are required. The recesses in the wearable strip are generally designed in the form of slots, so that particularly large areas and therefore large amounts of material of the profiled-section limbs can be pressed in. The distance between the edges of the recesses is generally less than the length of the recesses themselves, i.e. the wearable strip is, as it were, continuously joined to the basic profiled section. On account of the variable length of the recesses and the joining webs of the steel strip which lie between them, it is possible to produce an equilibrium between the tearing off of the narrow joining webs and the tearing off or tearing out of the profiled-section limbs. As a result, the tear-out force of the wearable strip is optimized to a maximum. A corresponding tear-out force cannot be achieved by round stamped holes and bolting or screwing of the steel strip.

Furthermore, the plastic deformation of the limbs of the basic profiled section into the recesses in the steel strip takes place with the formation of a large contact area and a high contact pressure. The contact pressure is produced as a result of calked material being forced into the recesses in the wearable strip, predominantly transversely to the stamped edges of the recesses, and not through tensile stress from joining elements which push the steel-strip limbs onto the basic profiled section. In addition, there is direct electrical contact between the basic profiled section and the steel strip, and not over a plurality of surfaces produced by pinning with connecting elements. It has been found that the electrical contact resistance produced by said process is significantly lower than with previous designs. Another considerable advantage is that the anchoring of the wearable strip takes place, through the limb of the basic profiled section and therefore to the material of the basic profiled section, with the result that additional possible instances of corrosion are precluded. A suitable process for producing composite profiled sections of this type is a continuous rolling process, which makes the process particularly economical.

In a further embodiment, the basic profiled section has profiled-section shoulders. When the profiled-section limbs are pressed on laterally, the wearable strip is bent around the profiled-section shoulders, so that the steel strip additionally encloses the basic profiled section. The advantage is that the steel strip laterally at least partially encloses the profiled-section head.

In another embodiment, the basic profiled section, on one or both sides, has longitudinal grooves for securing at least one further joining profiled section. The joining profiled section is preferably made from the same material as the basic profiled section. A joining profiled section is calked both into the longitudinal groove in the basic profiled section and into the recesses in the wearable strip by means of calking tools.

In a preferred form, the longitudinal groove in the basic profiled section is situated at a level behind the recesses in the steel strip. In this case, the joining profiled section has calking tongues which in terms of spacing and shape correspond to the recesses in the steel strip and are joined to one another via a head of the joining profiled section. The calking tongues of the joining profiled section are pressed from the outside, for example by means of rollers, through the recesses in the steel strip and into the longitudinal groove in the basic profiled section. This makes the process particularly economical. At the same time, the head of the joining profiled section forms a clean and smooth edge bar. This prevents the risk of injury when mounting the rail.

A particular advantage of separate joining profiled sections is that plastic deformation as far as possible takes place only in the joining profiled sections themselves, but not in the basic profiled section, so that the latter can repeatedly be used as a support for new wearable strips. It is also possible to exchange only sections of the wearable strip and to reassemble them with sections of new joining profiled sections.

Furthermore, it is possible, with the aid of each profiled-section limb on the basic profiled section, to form a trough, preferably with an undercut longitudinal groove, which lies opposite the profiled-section limb, in the basic profiled section, so that a rear-side, continuous filling by means of a free-flowing third material, e.g. molten metal or plastic, can take place through the molded niches in the wearable strip. When using a thermoplastic material, it is possible, after the wearable strip has become worn, to soften the filling and it is then easy to detach strip edges of the remaining wearable strip from the basic profiled section.

It is an advantage of the overall solution that the steel strip or parts of the steel strip, until completely abraded, remain joined to the basic profiled section by the initial joining force, and that the join can be visually examined and assessed from the outside. The result is a significant increase in reliability during use, and it is possible to employ wearable strips of greater than 6 mm.

As mentioned above, joining profiled sections of the type described above are generally used as conductor rails. The conductor rails generally hang freely, with the head of the steel strip at the bottom, in steel guides. As a result of the thermal expansion of the conductor rail, the conductor rails are moved to and fro through the steel guides. Friction notches are formed in the relatively soft basic profiled section made from aluminum. This can lead to the compensating movements becoming blocked and to damage to the rail system. To avoid this, on one or both sides the basic profiled section, at the profiled-section foot, has at least one further profiled-section notch. This profiled-section notch serves to secure or receive a further, generally thin, sliding strip or profiled section made from a material of higher strength than that of the basic profiled section. The sliding strip, e.g. a stainless steel strip, improves the sliding properties between the steel guide and the conductor rail and, on account of its high strength, prevents the steel guides from pressing into the basic profiled section. It can be joined to the conductor rail over the entire length of the rail, as a continuous sliding strip. Preferably, strip sections of approx. 500 mm are arranged at the positions where the conductor rail is suspended. This has the advantage that, in the event of wear, during the service life of the conductor rail of well over 50 years the sliding strip can be exchanged at any time. Sliding strips made from electrically nonconductive material, e.g. from plastic, can also be used. These improve the insulation of the conductor rail.

Further advantages, features and details of the invention will emerge from the following description of preferred exemplary embodiments and with reference to the drawing, in which.

Figure 1:
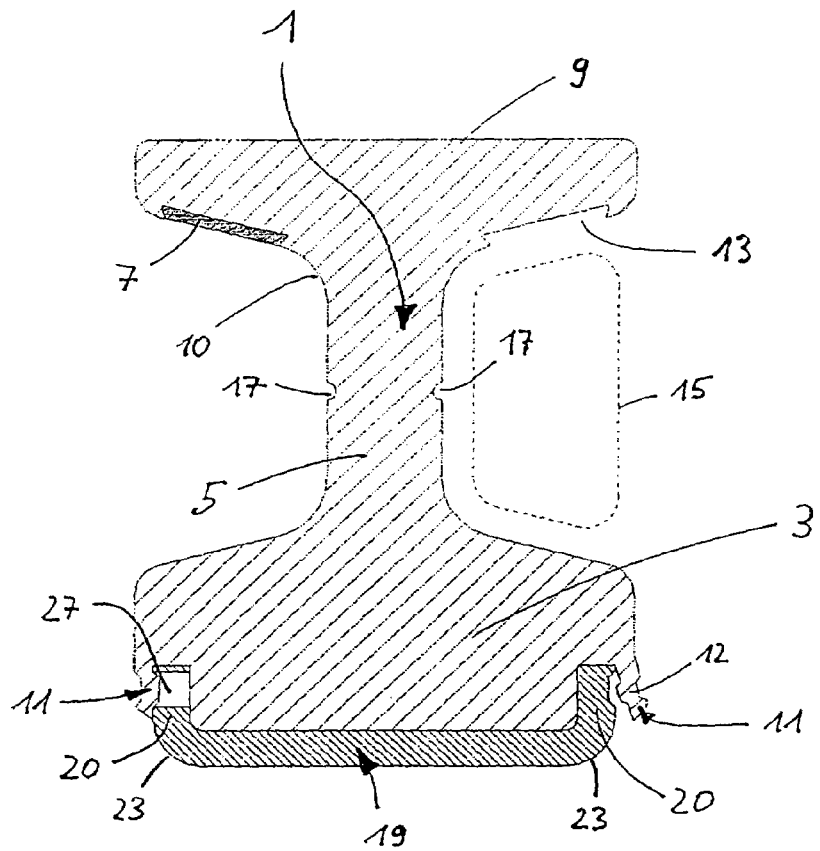
FIG. 1 shows a cross section through a conductor rail.

FIG. 1 shows a composite profiled section according to the invention. The composite profiled section is generally used as a conductor rail. The conductor rail has current collectors brushing along it at a rail head 3. The conductor rail therefore comprises a basic profiled section 1, which is generally made from aluminum, which exhibits good electrical conductivity, and is substantially formed from the rail head 3, a profiled-section web 5, which forms profiled-section pockets 15 and has furrows 17, and rail foot 9, and a wearable strip 19 which has a high resistance to abrasion and is generally a stainless steel strip. On both longitudinal edges, the steel strip 19 has, via bevels 23, the steel-strip limbs 20. Recesses 27 of a width e are situated in the steel-strip limbs 20. As a result of profiled-section limbs 11, if appropriate with a profiled-section limb lug 63 (cf. FIG. 7) and/or a transverse step 12, being pressed onto the steel strip 19 and parts of the profiled-section limbs 11 being calked into the recesses 27 in the steel-strip limbs 20, the steel strip 19 is held in a positively and nonpositively locking manner by the basic profiled section 1.

On both inner sides 10 of the rail foot 9, the composite profiled section has a sliding strip 7. The sliding strip, which is generally made from a hard, high-strength stainless steel strip, protects the rail foot, which is made from soft aluminum, against deformation caused by the conductor-rail suspension means. To this end, the basic profiled section 1 has a profiled-section notch 13 on both sides in the rail foot 9.

Figure 2:
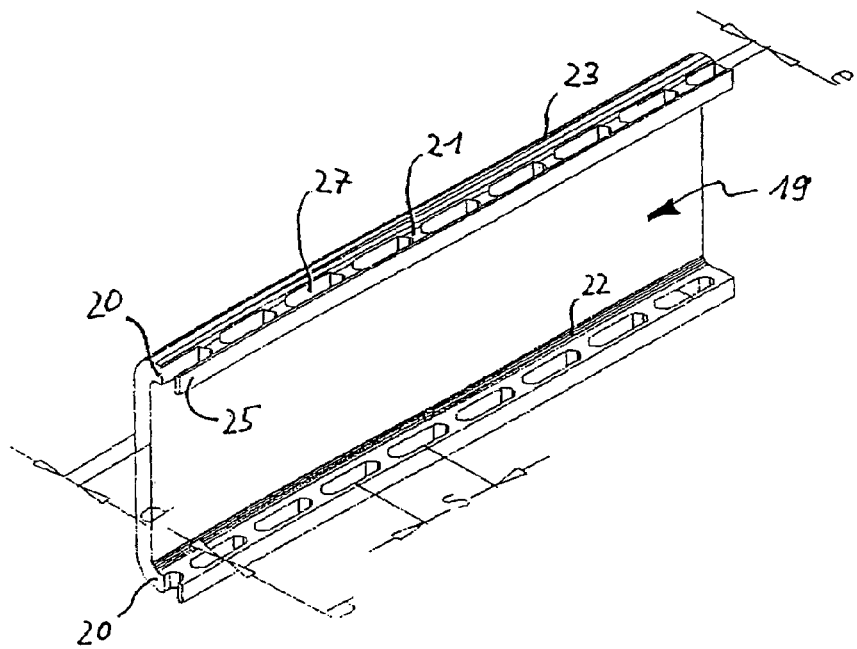
FIG. 2 shows a perspective view of a wearable strip according to the invention.

FIG. 2 shows a perspective view of the steel strip 19 of the conductor rail shown in FIG. 1. The two steel-strip limbs 20 have recesses 27. The recesses 27 on each side may, as illustrated, be offset with respect to one another, preferably by half the spacing 0.5·s between the recesses 27. As a result, the steel strip is alternately held in place by either one recess 27 or an opposite recess 27. To allow material of the profiled-section limbs 11 to successfully fill the recesses 27, it is advantageous for the recesses 27 to be designed in the form of a slot. The recesses 27 are preferably longer than the width of joining webs 21 which lie between them. In a particular embodiment, the joining webs 21 are additionally designed to be thinner than the thickness d of the steel strip 19. As a result, an edge termination, namely the anchor bar 25 with a height h, which in turn becomes thicker, is formed. The edge termination lies substantially in the form of an anchor in the basic profiled section 1 and has material of the profiled-section limb 20 calked around it so that it is securely embedded.

Figure 3:
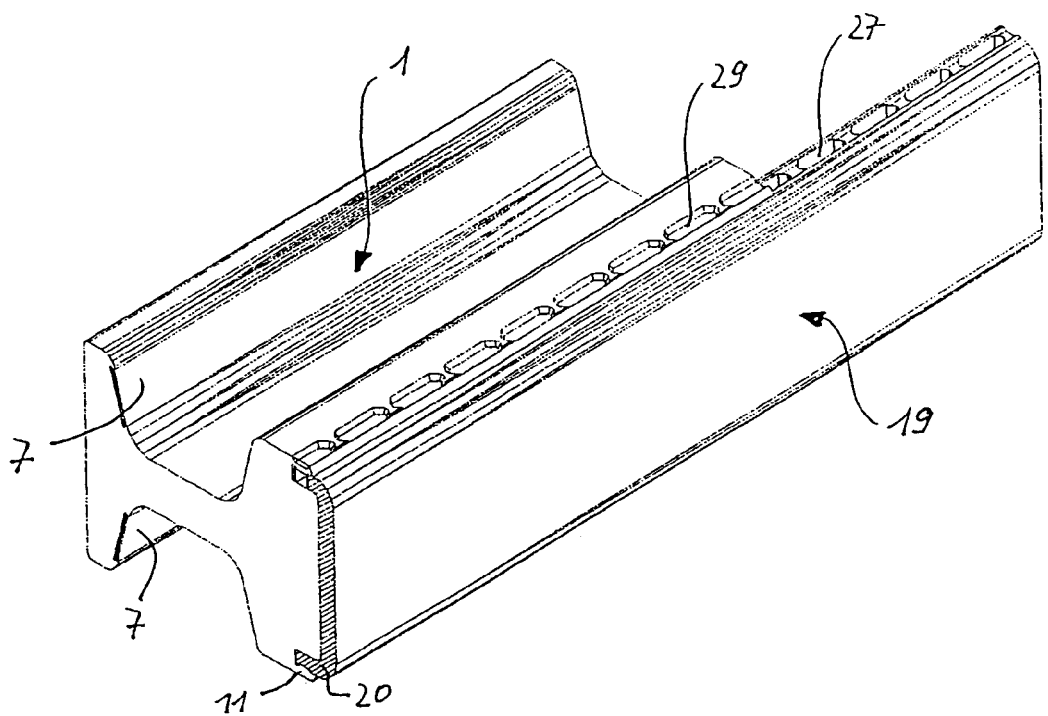
FIG. 3 shows a perspective view of a conductor rail section.

FIG. 3 shows a three-dimensional view of a short section of a conductor rail after mounting of the steel strip 19. By means of calking tools, the shape of which is similar to that of the recesses 27, material of the profiled-section limb 11 is pressed laterally into the recesses 27 in the steel strip 19 and as a result at least part of the recesses 27 is filled. Accordingly, impressions 29 of the calking tools can be seen on the outer side of the profiled-section limbs 20 of the basic profiled section 1.

Furthermore, sliding strips 7 are integrated in the rail foot 9, on both sides.

Figure 4:
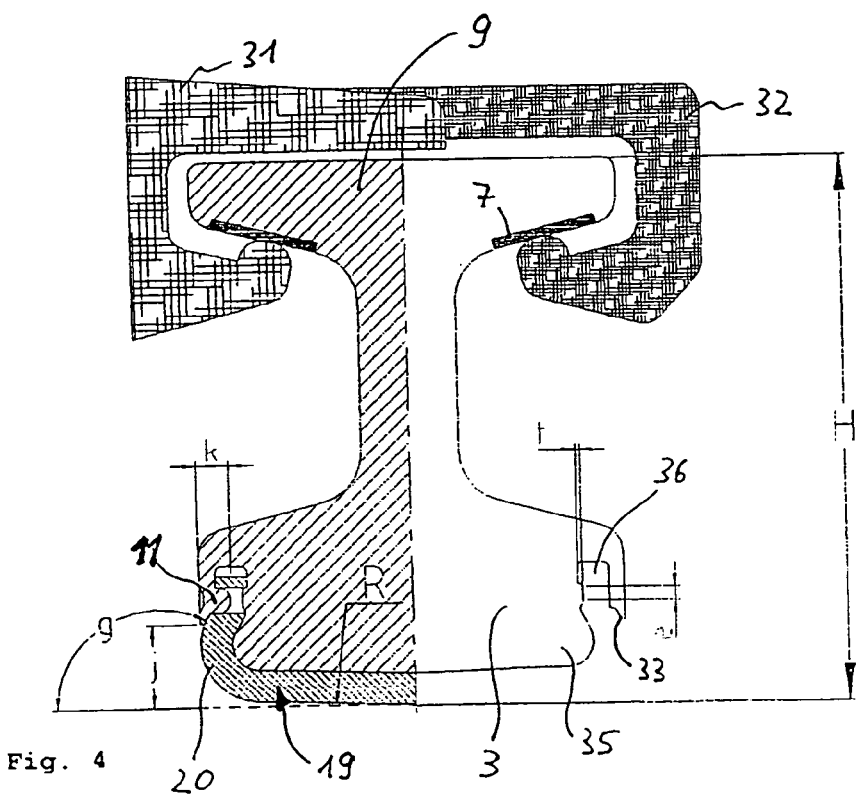
FIG. 4 shows a cross section through a further exemplary embodiment of a conductor rail.

FIG. 4 diagrammatically illustrates how a conductor rail hangs with the head at the bottom in conductor-rail suspension means 31, 32 and has a height H. The sliding strip 7 prevents the conductor-rail suspension means 31, 32 from pressing into the relatively soft rail foot 9, which is made from aluminum, over the course of time and, moreover, improves the coefficient of friction between conductor rail or sliding strip 7 and conductor-rail suspension means. In the event of thermal expansion of the conductor rail, the conductor rail slides through onto the conductor-rail suspension means with a significantly lower force.

Furthermore, the rail head 3 in FIG. 4 has a profiled-section shoulder 35 in a limb groove 36. When the profiled-section limbs 11 are pressed and calked onto the steel strip 19, the latter is bent around the profiled-section shoulder 35 and laterally encloses the rail head 3. The steel-strip limbs 20 are at an angle g of up to 150° with respect to the center of the basic profiled section 1. Over a height j, the steel strip 19 forms a section of the side face of the rail head 3, so that current collectors which impact obliquely from the side come into contact with the steel strip 19. Nevertheless, the steel-strip limbs 20, with a spacing k, rest deep in the rail head.

Most conductor rails, which are generally rolled from soft iron, have a radius at the rail head. Preferably, the steel strip 19 or the rail head 3 forms a corresponding radius R.

The steel strip 19 is held as a result of the profiled-section limbs 11 being calked into the recesses 27 in the steel strip. The basic profiled section 1 preferably has profiled-section molded protuberances 37 of a width e and a depth t which, when calked from the inside, penetrate into the recesses 27 in the steel strip. The profiled-section limb 11 may have an internal slope 33.

Figure 5:
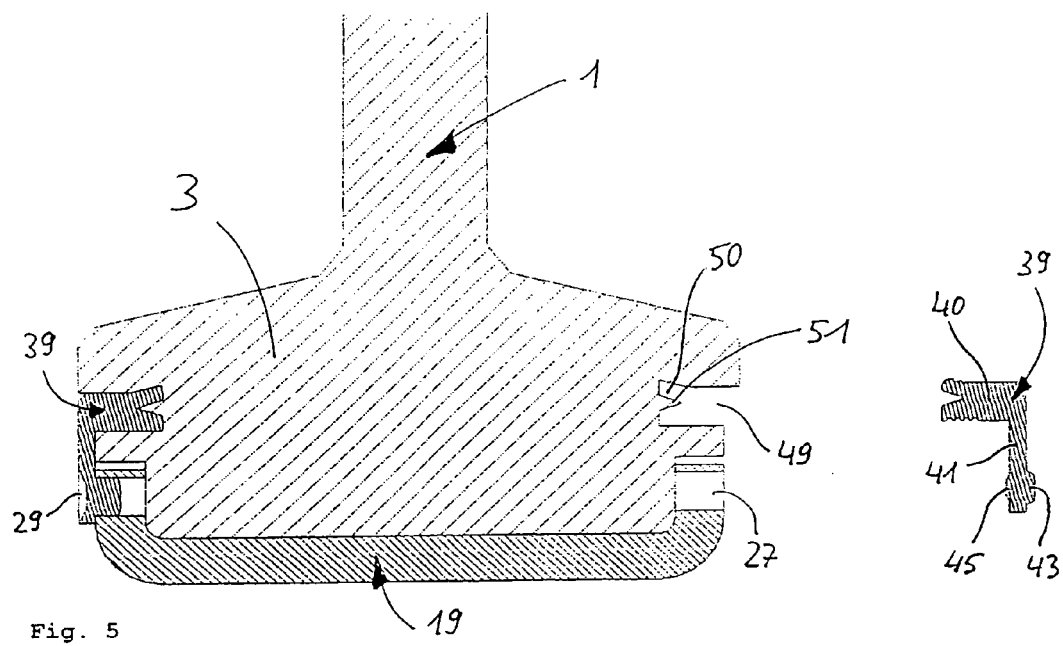
FIGS. 5–7 show partially illustrated cross sections through embodiments of the join between basic profiled section and wearable strip.

FIG. 5 diagrammatically depicts the mounting of the steel strip 19 by means of joining profiled sections 39. Joining profiled sections 39 have a body 40. The latter is pushed into insert grooves 49, in which it is calked from the outside by means of calking tools. A spreading pedestal 51 at the groove base 50 of the insert groove 49 spreads the two limbs at the body 40 of the joining profiled section 39, with the result that the joining profiled section 39 is secured so that it cannot be loosened or detached from the basic profiled section 1. An undulating structure or triangular toothing or the like on the surface of the body 40 additionally improves the tear-out strength.

The limbs 41 of the joining profiled section are in turn calked onto the recesses 27 in the steel strip 19. Preferably, the limb 41 has a thickened part 43, 45 on one or both sides. As a result, more material can be forced into the recesses and the tear-out force can be increased.

Figure 6:
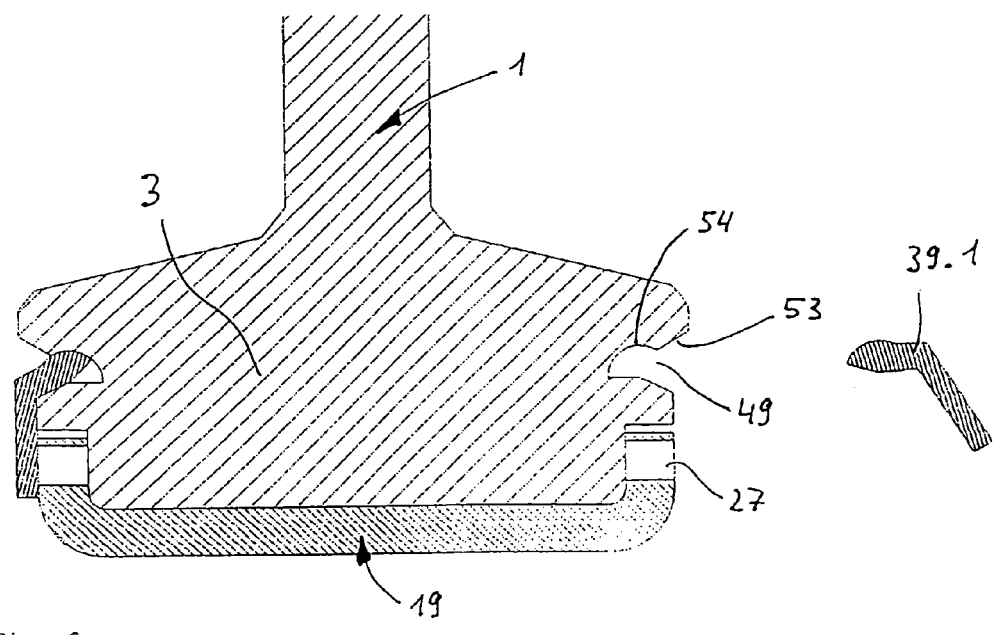

As shown in FIG. 6, joining profiled sections 39.1 can also simply be latched or engaged into the basic profiled section 1. For this purpose, the insert groove 49 may have a corresponding internal molded niche 54. The advantage is that the joining profiled section 39.1 is not calked to the basic profiled section 1 and if necessary can be replaced without problems after the steel strip 19 has become worn.

Figure 7:
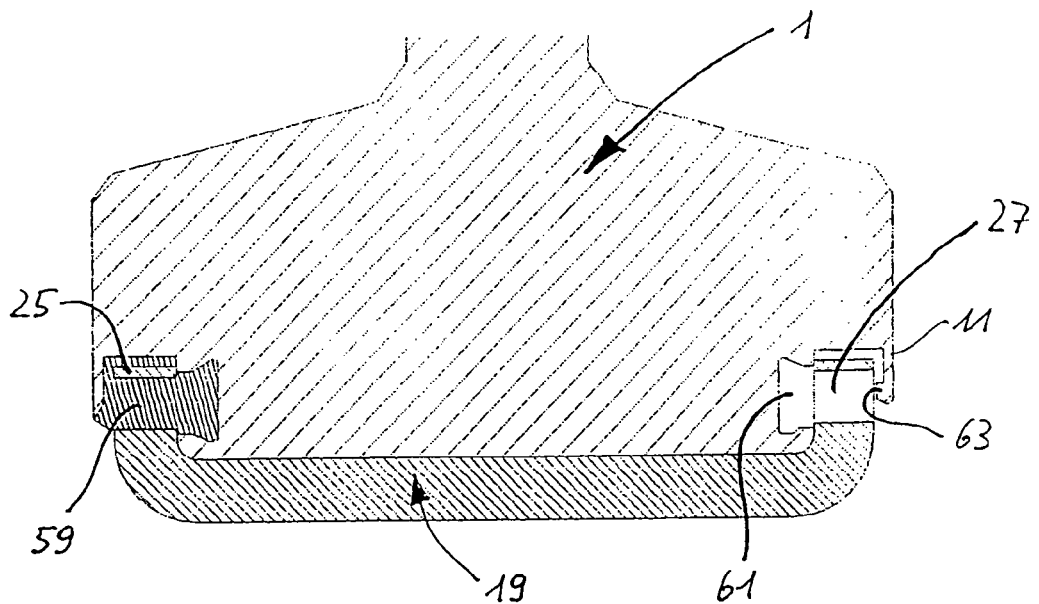

In a further exemplary embodiment illustrated in FIG. 7, the basic profiled section 1 has filling recesses 61 behind the recesses 27 in the steel strip 19. A free-flowing filler material or joining material 59 is pressed into the recesses 27 and filling recesses 61 from the outside.

The filling recesses 61 are preferably conically wider toward the groove base or have undercuts. The recesses 27 in the steel strip 19 or their center axis M for their part preferably likewise have a conical molded shape with an angle a (cf. FIG. 8) or an inclination with an angle b. Furthermore, the recesses 27 may also have a funnel-shaped bevel with an angle p.

After the joining material 59 has set, the steel strip 19 is joined in a positively locking manner to the basic profiled section 1. If thermoplastic joining materials 59 are used, they can easily be separated from the basic profiled section 1 after the conductor rail has become worn. This facilitates installation of a new steel strip 19.

Figure 8:
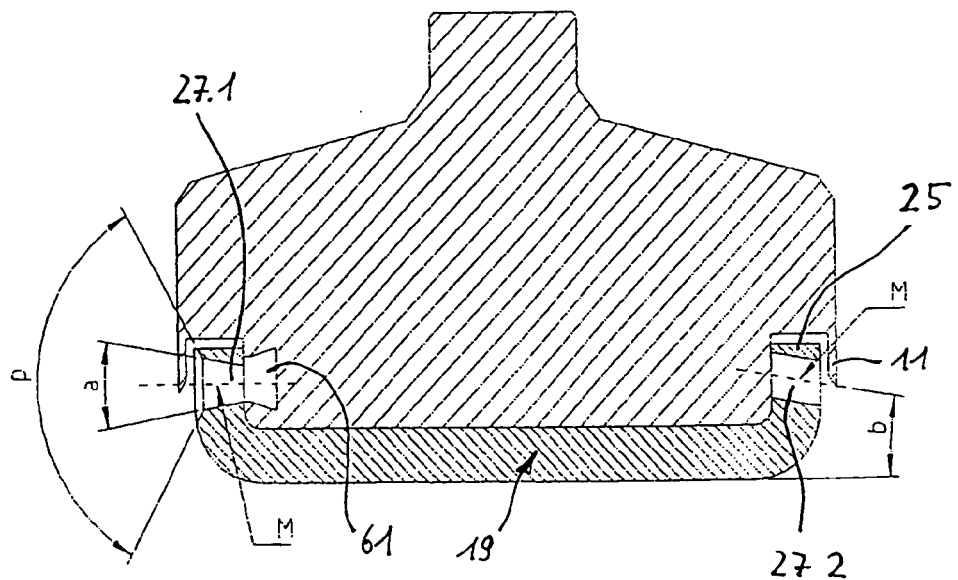
FIG. 8 shows a cross section through a conductor rail with differently shaped recesses in the steel strip.

FIG. 8 shows preferred embodiments of the recesses 27.1 and 27.2 in the steel strip 19 as mentioned in FIG. 7.

Figure 9:
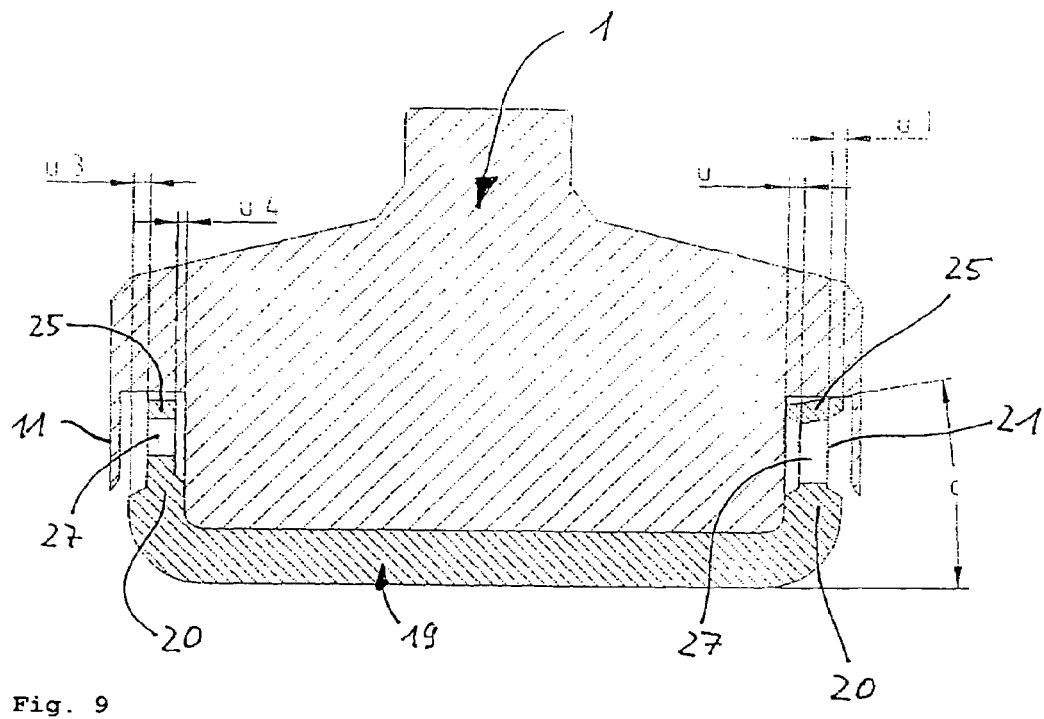
FIG. 9 shows a cross section through a conductor rail with differently shaped steel-strip limbs.

FIG. 9 shows preferred embodiments of the steel-strip limbs 20. A reduction in the thickness of the steel-strip limb 20 improves the filling of the recesses 27. At the same time, the thickness of the profiled-section limbs 11 of the basic profiled section 1 can be increased and therefore the tear-out strength can be improved further.

Even a wider anchor bar 25 at the end of the steel-strip limb 20 improves the positive lock between basic profiled section 1 and steel strip 19. For this purpose, the joining webs 21 of the steel strip 19, on one or both sides, are designed to be thinner, by u1 and/or u1 and u2 or u3, u4, than the thickness d of the steel strip 19, for example by being forged to a lower thickness. Furthermore, the anchor bar 25 is chamfered at angle c.

Figure 10:
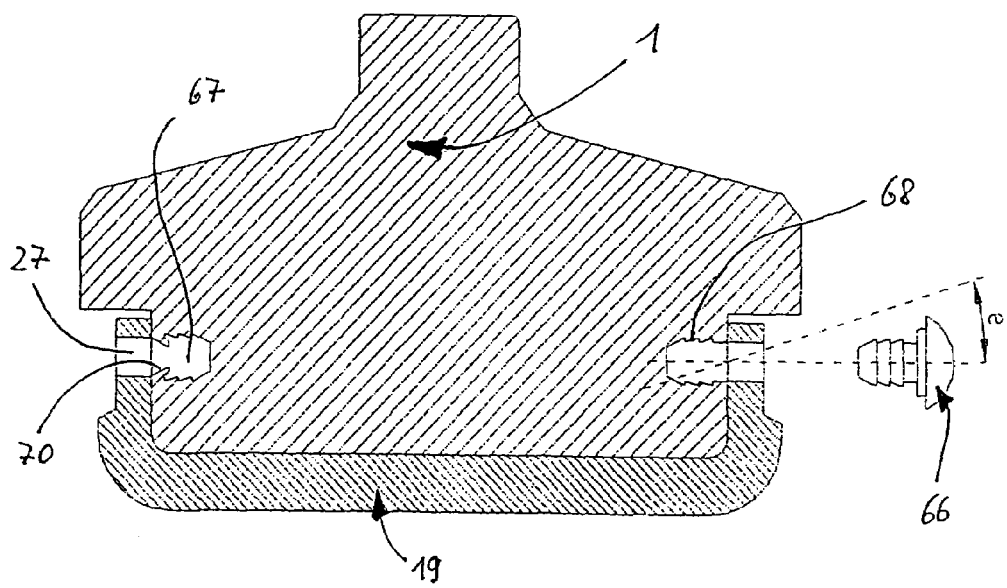
FIG. 10 shows a cross section through a further embodiment of the join between basic profiled section and wearable strip.

In the embodiment according to the invention which is illustrated in FIG. 10, the basic profiled section 1 has a calking groove 67. Connecting elements 66, such as bolts, screws, etc. or joining profiled sections are pressed or screwed into the calking groove or joined in some other suitable way through the recesses 27 in the steel strip. On its inner side, the calking groove 67 preferably has a barb-like internal molded niche 68 or toothing, which prevents the join from becoming detached. By way of example, resilient tongues 70 are also suitable for this purpose.

Figure 11:
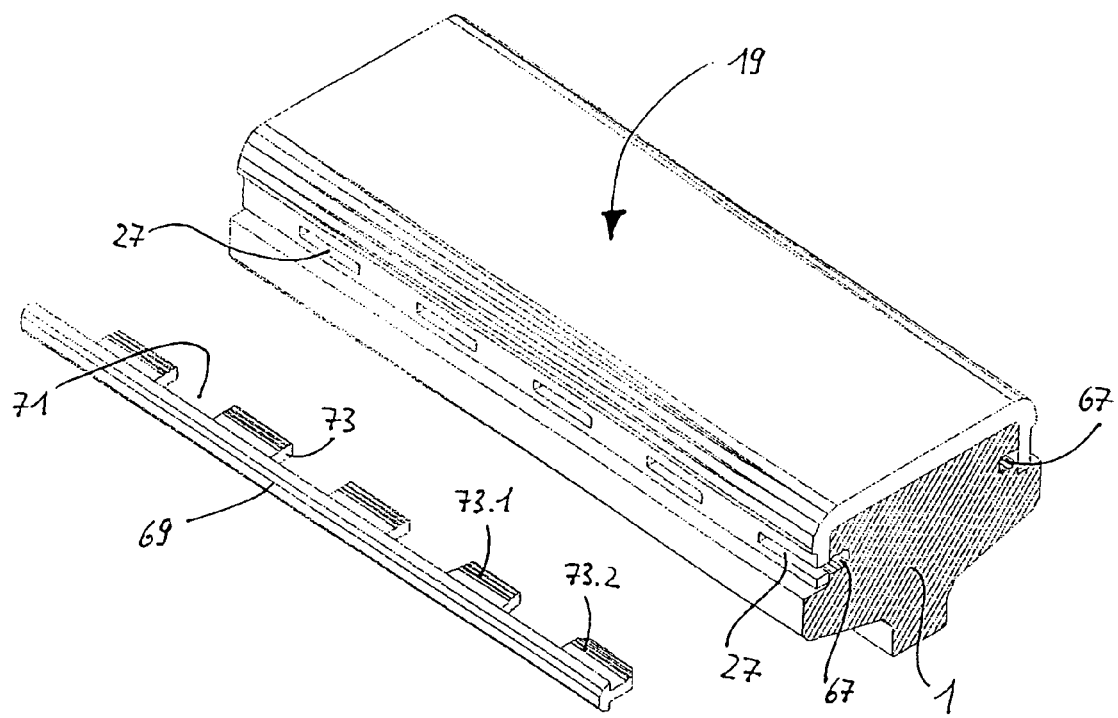
FIG. 11 shows a perspective view before the join is made.

In a particular exemplary embodiment in accordance with FIG. 11, the steel strip 19 is secured to the basic profiled section 1 by means of a joining profiled section 69. The joining profiled section 69, which is, for example, an extruded aluminum section, in this case has equidistant recesses 71. As a result, calking tongues 73 remain on the joining profiled section 69 and are introduced into the recesses 27 in the steel strip and are calked into the calking groove 67 in the basic profiled section 1.

Conically pointed calking tongues 73.1 or calking tongues with bevels on two sides, 73.2, considerably facilitate introduction into the recesses 27 in the steel strip 19 and assembly.

Figure 12:
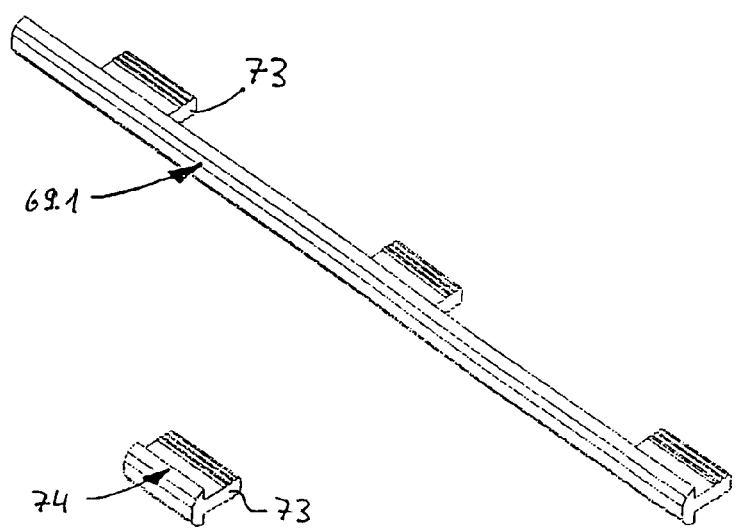
FIG. 12 shows a perspective view of a joining profiled section.

FIG. 12 shows a joining profiled section 69.1 in which every second calking tongue 73 is missing. The joining profiled section 69.1 can only be pulled out again by mechanical means with a high level of force being exerted. Since, for example, if calking tongues 63 are broken off they remain in the calking groove 67 or the calking groove 67 is plastically deformed, widened and possibly damaged, a further calking profiled section 69 in the same position would not hold or would have more difficulty holding in the calking groove 67. However, if a calking tongue 73 is only pressed into every second recess 27 in the steel strip 19, which is quite sufficient to achieve a high tear-off force, a joining profiled section 69.1 can be calked into an undamaged section of the calking groove 67 a number of times in a new position which is in each case offset by about the width of the calking tongue 73. It is also conceivable for only individual grooved wedges 74 to be calked.

Figure 13:
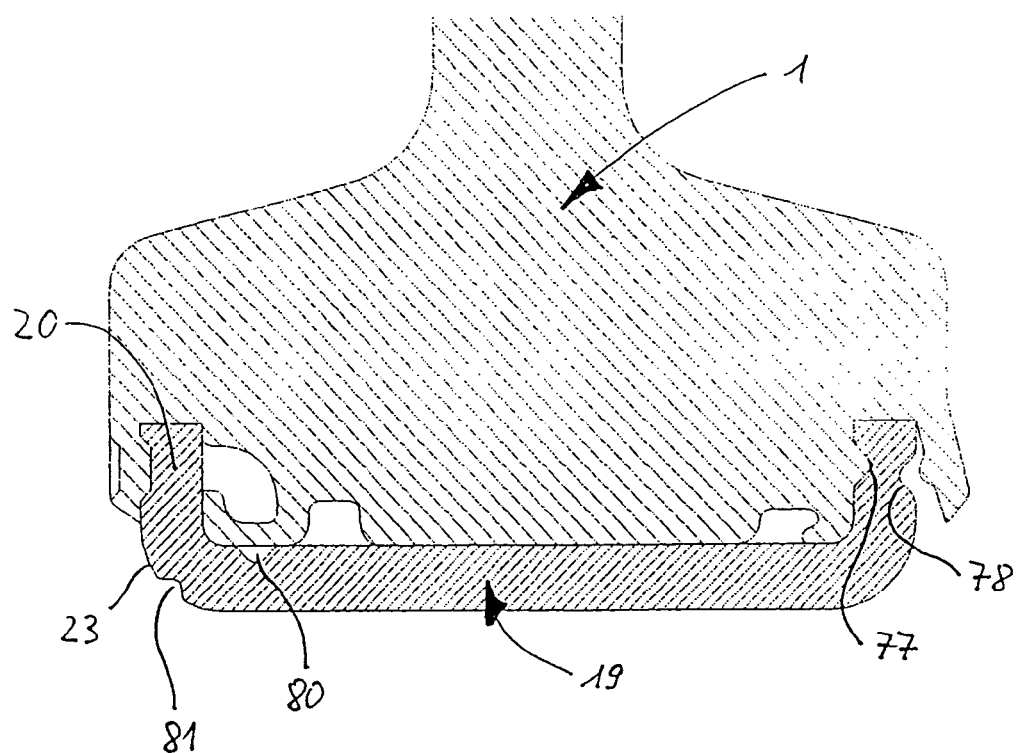
FIG. 13 shows a cross section through an embodiment of the rail head and steel strip.
Figure 14:
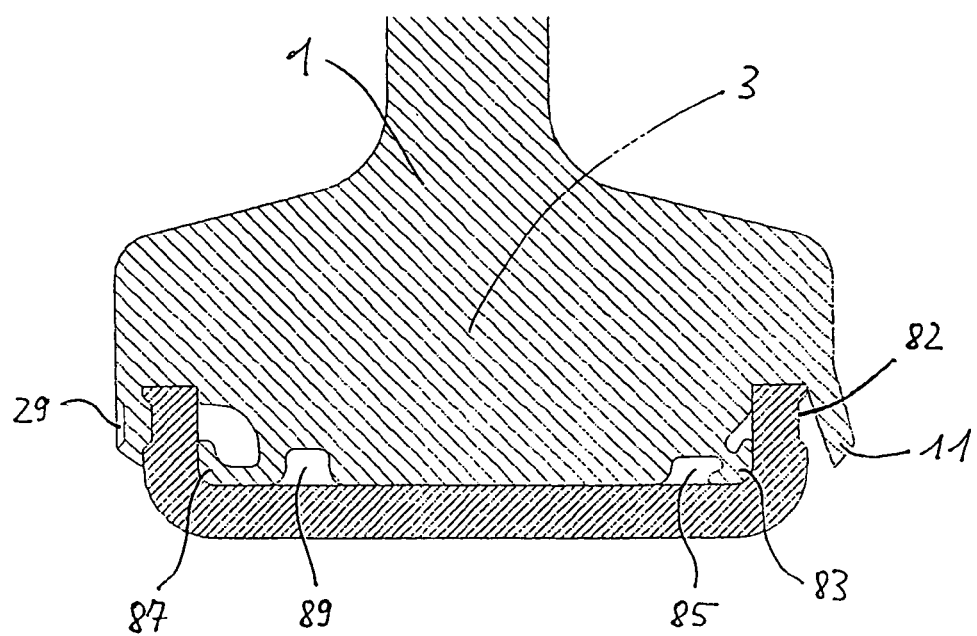
FIG. 14 shows a cross section through a further embodiment of a rail head.

To achieve a better positively locking join between steel strip 19 and basic profiled section 1, the steel strip 19 in FIG. 13 has at least one indentation 77, 78 or 82 in FIG. 14, on one or both sides of the steel-strip limb 20. Indentations 80, 81 in the region of the bevel 23 or an inner edge 22 (cf. FIG. 2) of the steel-strip limb 20 improve the bendability and allow smaller outer radii.

Preferably, on at least one longitudinal edge of the rail head 3, the basic profiled section 1 has a clamping molded protuberance 87 or spreading molded protuberance 83 as illustrated in FIG. 14. As a result, the steel strip is centered in the middle and laterally is clamped with a defined compressive force in accordance with the section modulus of the molded protuberances 83, 87.

Further recesses 85, 89 are used for the particular design of the clamping molded protuberance or spreading molded protuberance and/or are used, for example, for the introduction of heating wire elements in order to heat the rails so as to prevent the formation of ice in the event of snow and frost.

Figure 15:
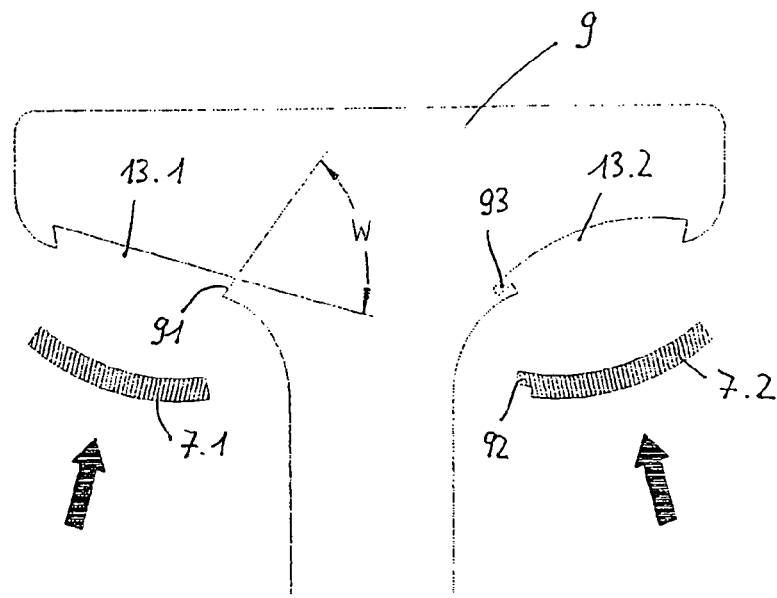
FIGS. 15–17 show diagrammatic illustrations of rail feet and various embodiments of a sliding strip.

To install sliding strips 7, the rail foot 9 in FIG. 15 has profiled-section notches 13.1, 13.2 on both sides. The inner flanks 91 of the profiled-section notch 13.1 are preferably designed with an undercut of angle W. The sliding strip 7.1 has side faces which likewise slope at the angle W and is, for example, inserted in slightly bent form, as indicated in FIG. 15, into the profiled-section notch 13.1.

The profiled-section notch is preferably of concave design, 13.2. It has proven advantageous for the sliding strip 7.2 to be made from spring metal sheet. The sliding strip 7.2 automatically springs into the concave profiled-section notch 13.2. A sliding-strip molded protuberance 92 which engages in an undercut 93 in the rail foot 9 further improves the secure seating of the sliding strip 7.2. The sliding-strip molded protuberance 92 is preferably oversized, so that it can be pressed in a clamping manner into the undercut 93.

Figure 16:
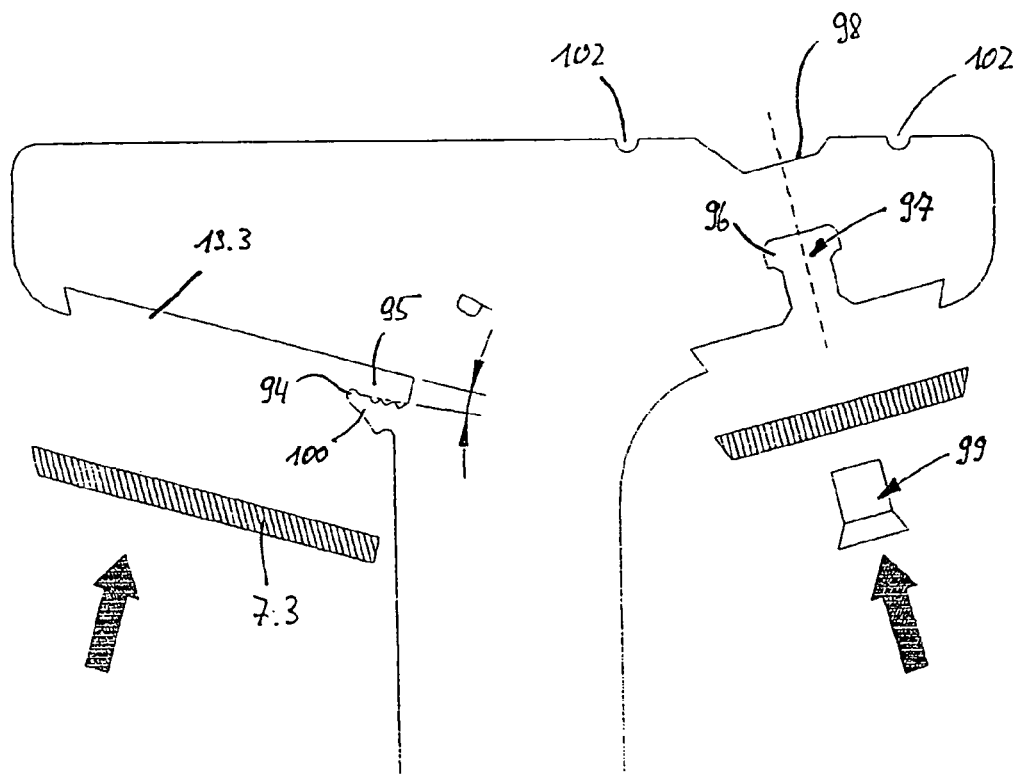

FIG. 16 shows further possible embodiments. By way of example, the profiled-section notch 13.3 additionally has an insert groove 95. The insert groove 95 is preferably designed to narrow conically, or the inner surface of a resilient limb 100 forms an angle q with respect to the inner surface of the profiled-section notch 13.3. A clamping lug 94 clamps the sliding strip 7.3 securely in the insert groove. Preferably, the inner surfaces of the insert groove are of triangular or undulating design.

Adequate clamping is very important, since as a result of thermal expansion the entire weight of the rail is pushed through the rail suspension means. The sliding strips 7 must not themselves move in the profiled-section recess 13. To prevent this, the sliding strips are preferably prevented from displacement by means of bolts, rivets, screws or other suitable connecting elements. For this purpose, the rail foot 9 has, for example, a securing groove 97 for connecting elements. The securing groove 97 has a bevel 106 and undercuts 96, for example at the groove base or on its side faces. Rivets or bolts can be knocked into the securing groove or screws can be inserted. A bearing surface 98 on the outer side of the rail foot 9, perpendicular to the center axis of a joining element 99, serves as an auxiliary surface for attaching connecting tools, e.g. hydraulic pliers or the like. Positioning furrows 102 also help to position joining tools exactly for optimum installation of the sliding strips 7 and for fitting the connecting elements 99.

Figure 17:
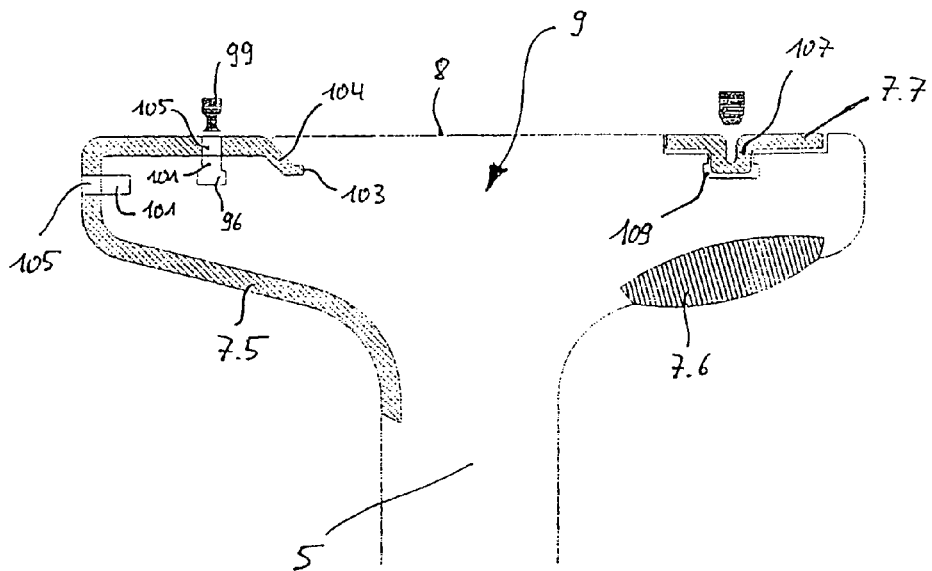

FIG. 17 shows further exemplary embodiments of sliding strips 7. By way of example, the sliding strip 7.5 laterally encloses the rail foot 7. The advantage is that in rails which are mounted with the steel strip upside down, the sliding strip can be fitted on laterally and can be assembled with the rail foot 9 from above or laterally. For this purpose, the rail foot 9 has recesses or grooves 101 laterally or on the underside 8. Advantageously, there is a latching groove 103 in the rail foot 9, so that the sliding strip 7.5 can be hooked in by means of latching tongue 104. At the same time, the sliding strip 7.5 offers protection for the rail foot 9 at the side, since in this case too friction or impacts against the rail suspension means may occur.

A further sliding strip 7.7, in this case only shown as a section on the underside 8 of the rail foot 9, has a molded strip protuberance 107, which lies in an insert groove 109. The sliding strip 7.7 may, for example, be assembled with the rail foot 9 by means of bolts or may simply be pressed and calked into the insert groove 109, toward the groove base and transversely onto the groove walls, by means of calking tools. The transverse calking and plastic deformation of the sliding strip 7.7 prevents displacement in the longitudinal direction of the rail and at the same time the sliding strip is securely joined to the basic profiled section 1.

Although sliding strips have proven advantageous, the sliding strip may also be replaced by a sliding profiled section 7.6, which offers the advantage that it can often be designed to be thicker.

Figure 18:
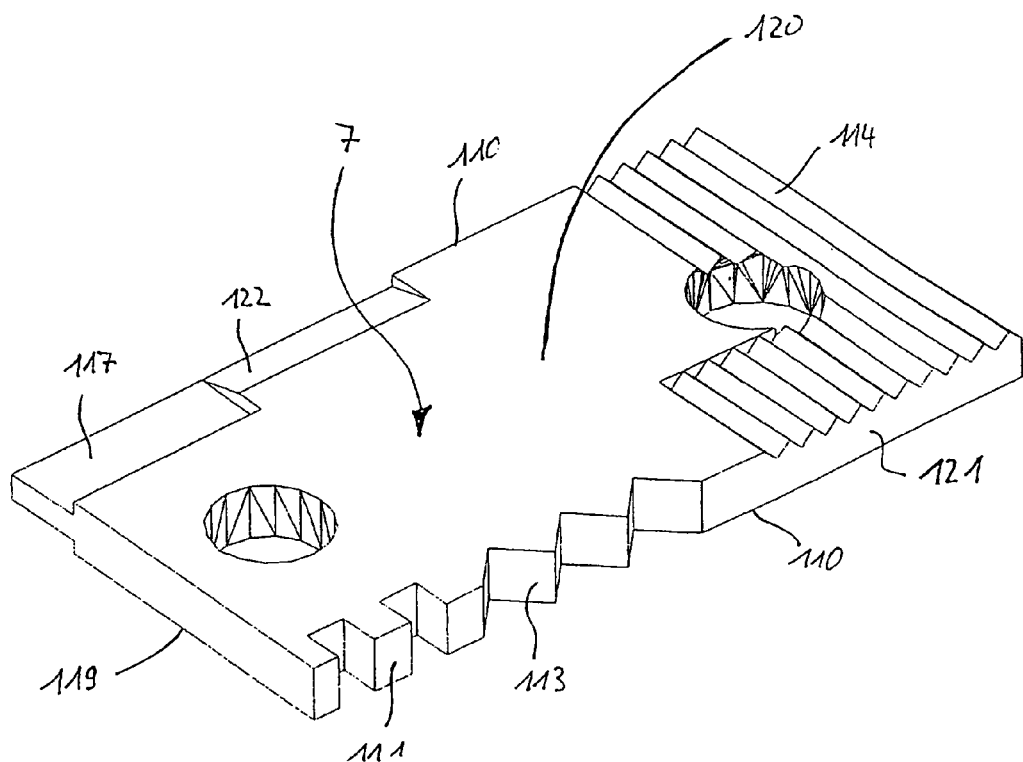
FIG. 18 shows a perspective view of a sliding strip with various exemplary embodiments.

The sliding strip 7 with a sliding surface 119 and an underside 120 furthermore has specific features as illustrated in FIG. 18. An underside 120, i.e. the bearing side with respect to the basic profiled section 1, has preferably triangular, sharp molded protuberances 114 running transversely to the longitudinal edges 110 or similar molded protuberances. The sliding strip is pushed onto the rail foot and at the same time the molded protuberances are pushed into the material of the basic profiled section 1 by the inherent weight of the rails. As a result, with predominantly clamping connections of the sliding strip, as at 7.1 or 7.3, displacement is prevented.

Tooth-like or triangular molded protuberances 111, 113 on the side faces 121 of the sliding strips 7 are also suitable for preventing displacement. They cut and push in particular into conical insert grooves, e.g. 93 or 95, in the material of the basic profiled section 1.

In a corresponding manner to the undercuts 93 or latching grooves 103, etc., the sliding strip 7 has a relatively thin border 117 on one or both sides. A side border 122 may be beveled along the longitudinal edges 110 on the strip top side and/or the strip underside.

If the sliding strip is joined to the basic profiled section 1 by means of bolts or rivets or similar connecting elements, it may be advantageous for recesses 105 already to be provided for this purpose in the sliding strip 7. They also serve, for example, to predetermine and define the precise assembly points.

In a further preferred embodiment, the sliding strip consists of a high-strength material with good sliding properties which, however, is not electrically conductive. This allows the insulation of the conductor rail to be additionally improved.

Figure 19:
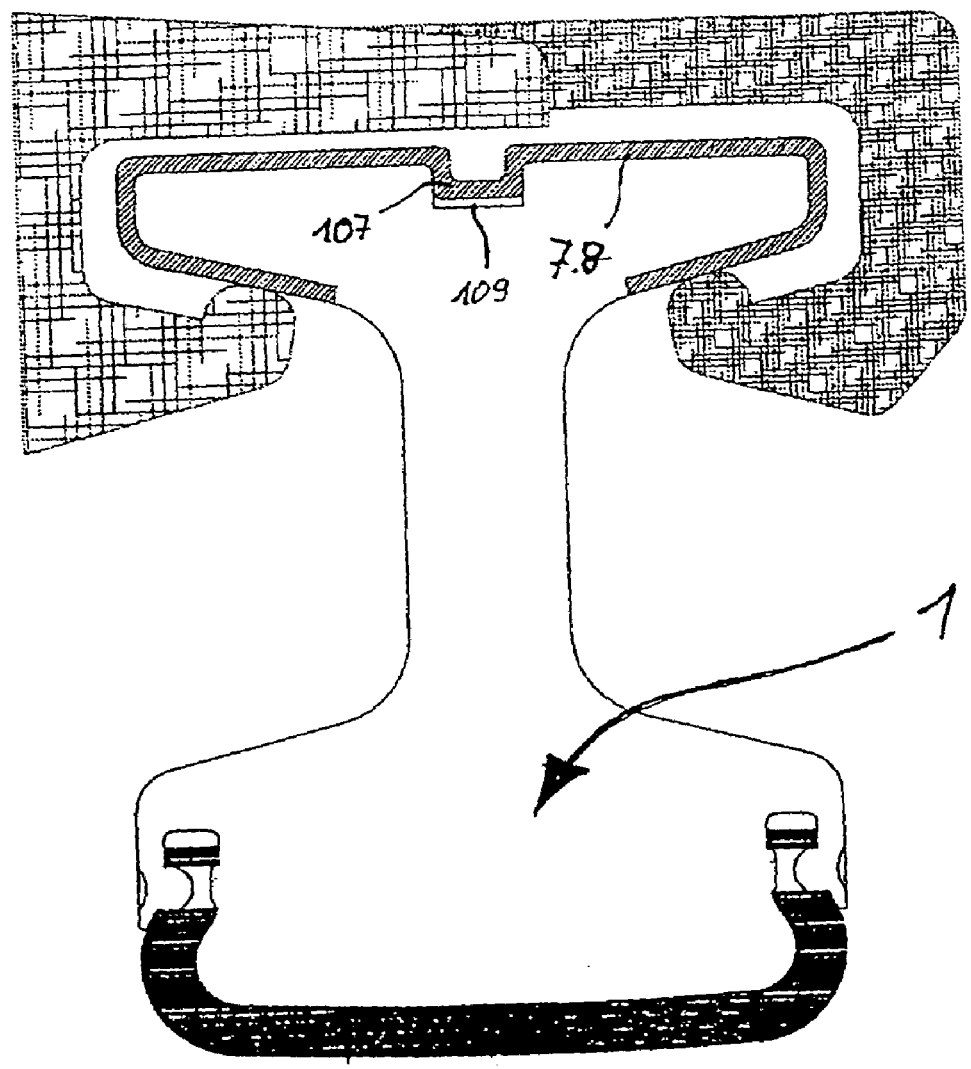
FIG. 19 shows a cross section through a further exemplary embodiment of a conductor rail.

Furthermore, it has proven advantageous for the sliding strip to be of symmetrical design, in such a way that it encloses the rail foot on both sides. As shown in FIG. 19, in this way the sliding strip completely encloses the rail foot. By means of a molded strip protuberance 107, it can be secured against displacement in an insert groove 109.

The sliding strip 7.8 is, for example, laid in sections of approximately 500 mm, during rail assembly, between conductor rails and rail suspension means and is mechanically connected to the conductor rail.

What is claimed is:

1. A composite profiled section comprising a basic profiled section made from a material with a good electrical conductivity and at least one surface coating which is joined to the basic profiled section and is made from a material with a higher resistance to abrasion, in particular a metal wearable strip, wherein the wearable strip, on at least one of its longitudinal edges, has recesses, which are at least partially filled by a joining profiled section consisting of a profiled section limb extending from said basic profiled section, and are thus joined to the basic profiled section in a nonpositively and/or positively locking manner, and wherein said profiled section limb is formed of the same material as the basic profiled section and has a fixed end attached to and a free end unattached to the basic profiled section.

2. The composite profiled section as claimed in claim 1, wherein the recesses, on an edge side, define an anchor bar of a height (h).

3. The composite profiled section as claimed in claim 1, wherein a rail foot (9) circumferentially has at least one profiled-section notch (13) for installation of a further wearable strip (7).

4. The composite profiled section as claimed in claim 1, wherein the basic profiled section (1) has at least one further securing groove (101) on the underside (8) and/or one of the side faces of the rail foot (9).

5. The composite profiled section as claimed in claim 1, wherein the basic profiled section (1) has at least one further insert groove (109) for a further sliding profiled section (7.7) on the underside (8) of the rail foot (9).

6. The composite profiled section as claimed in claim 1, wherein the basic profiled section (1) has a profiled-section notch around at least one outer limb of the rail foot (9), for a sliding strip (7.5, 7.8) which is substantially in the form of a half-shell or is bent in the manner of a clamp.

7. The composite profiled section as claimed in claim 1, wherein a sliding strip is inserted or mounted in a profiled-section notch.

8. The composite profiled section as claimed in claim 7, wherein the sliding strip is made from stainless steel.

9. The composite profiled section as claimed in claim 7, wherein the sliding strip consists of an electrically nonconductive material.

10. The composite profiled section as claimed in claim 7, wherein the sliding strip (7), along at least one longitudinal edge (110), has a transverse ribbed structure (114) on a narrow side strip or on the entire sliding surface (119) and/or underside (120).

* * * * *